United States Patent
Kim et al.

(10) Patent No.: US 12,469,493 B2
(45) Date of Patent: Nov. 11, 2025

(54) DISPLAY DEVICE AND OPERATING METHOD THEREOF

(71) Applicant: LG ELECTRONICS INC., Seoul (KR)

(72) Inventors: Taejoon Kim, Seoul (KR); Jaekyung Lee, Seoul (KR); Changmin Kwak, Seoul (KR); Yongtae Kim, Seoul (KR); Sunki Min, Seoul (KR); Hyangjin Lee, Seoul (KR); Yeongbin Byeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 18/187,833

(22) Filed: Mar. 22, 2023

(65) Prior Publication Data
US 2024/0105172 A1 Mar. 28, 2024

(30) Foreign Application Priority Data
Sep. 28, 2022 (KR) ............... 10-2022-0123817

(51) Int. Cl.
*G10L 15/22* (2006.01)
*H04N 21/422* (2011.01)
*H04N 21/472* (2011.01)

(52) U.S. Cl.
CPC ....... *G10L 15/22* (2013.01); *H04N 21/42203* (2013.01); *H04N 21/472* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,437,217 B2 | 9/2016 | Kwon | |
| 2004/0128012 A1* | 7/2004 | Lin | G06F 3/014 700/100 |
| 2009/0070098 A1* | 3/2009 | Patryshev | G06F 3/04886 715/773 |
| 2011/0153325 A1* | 6/2011 | Ballinger | G06F 3/04886 704/235 |
| 2013/0173270 A1* | 7/2013 | Han | H04N 21/47 704/E21.001 |
| 2013/0285926 A1* | 10/2013 | Griffin | G06F 3/04886 345/173 |

(Continued)

FOREIGN PATENT DOCUMENTS

KR 10-1456974 10/2014
KR 10-2015-0056276 5/2015

OTHER PUBLICATIONS

European Patent Office Application Serial No. 23164658.9, Search Report dated Feb. 19, 2024, 4 pages.

*Primary Examiner* — Jonathan C Kim
(74) *Attorney, Agent, or Firm* — LEE, HONG, DEGERMAN, KANG & WAIMEY

(57) ABSTRACT

In order to assist a voice recognition function when voice recognition has failed, a display device may comprise a display, a user input interface configured to receive a command from a remote control device, and a controller configured to display a keyboard window including one or more queries and a keyboard item on the display when voice recognition for a voice command uttered by a user has failed in a state in which a voice recognition function is activated.

18 Claims, 12 Drawing Sheets

(56) References Cited

U.S. PATENT DOCUMENTS

| | | | | |
|---|---|---|---|---|
| 2014/0164975 A1* | 6/2014 | Kang | G06F 3/04845 | 715/773 |
| 2014/0181865 A1* | 6/2014 | Koganei | H04N 21/4312 | 725/38 |
| 2014/0350925 A1 | 11/2014 | Park | | |
| 2015/0243278 A1* | 8/2015 | Kibre | G10L 15/187 | 704/243 |
| 2015/0310854 A1* | 10/2015 | Takemura | G06F 40/30 | 704/254 |
| 2016/0070441 A1* | 3/2016 | Paek | G06F 3/0485 | 715/773 |
| 2016/0092447 A1* | 3/2016 | Venkataraman | G06F 16/433 | 707/765 |
| 2017/0092270 A1* | 3/2017 | Newendorp | H04N 21/42203 | |
| 2017/0339468 A1* | 11/2017 | Lee | H04N 21/4722 | |
| 2017/0364520 A1* | 12/2017 | Venkataraman | H04N 21/4828 | |
| 2018/0314343 A1* | 11/2018 | Montaldi | G06F 40/274 | |
| 2018/0315426 A1* | 11/2018 | Oh | G10L 15/22 | |
| 2018/0330730 A1* | 11/2018 | Garg | G10L 15/1815 | |
| 2019/0237085 A1* | 8/2019 | Ryu | G06F 3/165 | |
| 2020/0168215 A1* | 5/2020 | Heo | H04N 21/4821 | |
| 2020/0341730 A1* | 10/2020 | Min | H04N 21/4828 | |
| 2021/0174795 A1* | 6/2021 | Robert Jose | G06F 3/167 | |
| 2021/0280180 A1* | 9/2021 | Skobeltsyn | G06F 16/90324 | |
| 2023/0022515 A1* | 1/2023 | Aher | H04N 21/42203 | |
| 2024/0105172 A1* | 3/2024 | Kim | G10L 15/22 | |
| 2024/0194188 A1* | 6/2024 | Weisz | G10L 15/22 | |
| 2024/0221739 A1* | 7/2024 | Prasad | H04N 21/4828 | |

* cited by examiner

DISPLAY DEVICE AND OPERATING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2022-0123817, filed on Sep. 28, 2022, the contents of which are hereby incorporated by reference herein in their entirety.

BACKGROUND OF THE INVENTION

1. Field of the Invention

The present disclosure relates to a display device, and more particularly, to a display device capable of providing a voice recognition function.

2. Discussion of the Related Art

Digital TV services using wired or wireless communication networks are becoming common. Digital TV services may provide various services which cannot be provided by the existing analog broadcast service.

For example, Internet protocol television (IPTV) and smart TV services which are types of digital TV services provide interactivity to allow user to actively select a type of a program to be watched, a viewing time, etc. The IPTV and smart TV services may provide various additional services, such as Internet search, home shopping and online games, based on such interactivity.

A recent TV may provide a voice recognition function according to a user's utterance. However, conventionally, there are many cases where the user does not know the utterance supported by the TV at the time of using the voice recognition function.

That is, in many cases, the user does not say anything while the voice recognition function is activated, such as when the user presses a microphone button provided in a remote controller to use the voice recognition function.

Accordingly, usability of the voice recognition function of the TV is deteriorated.

SUMMARY OF THE INVENTION

An object of the present disclosure is to provide a display device capable of increasing usability of a voice recognition function by using a virtual keyboard window as an input unit supporting a voice recognition function.

An object of the present disclosure is to increase usability of a voice recognition function by providing a plurality of recommendation queries to a keyboard window when voice recognition has failed due to no utterance.

An object of the present disclosure is to increase usability of a voice recognition function by providing queries similar to utterances to a keyboard window when voice recognition for a plurality of utterances has failed.

A display device according to an embodiment of the present disclosure may comprise a display, a user input interface configured to receive a command from a remote control device, and a controller configured to display a keyboard window including one or more queries and a keyboard item on the display when voice recognition for a voice command uttered by a user has failed in a state in which a voice recognition function is activated.

The controller may determine that the voice recognition has failed and display the keyboard window including a plurality of recommendation queries, when the voice command is not received within a predetermined time.

The controller may determine that the voice recognition has failed and display the keyboard window including a plurality of candidate queries, when the voice command is recognized within a predetermined time and voice recognition is impossible for a predetermined number of utterances.

According to an embodiment of the present disclosure, usability of a voice recognition function is increased, so that an improved voice recognition experience can be provided to a user.

According to an embodiment of the present disclosure, a user-customized voice recognition function may be provided by providing recommendation queries suitable for a user through a keyboard window.

According to an embodiment of the present disclosure, a voice recognition service that meets user's needs may be provided by providing queries similar to a command uttered by a user.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
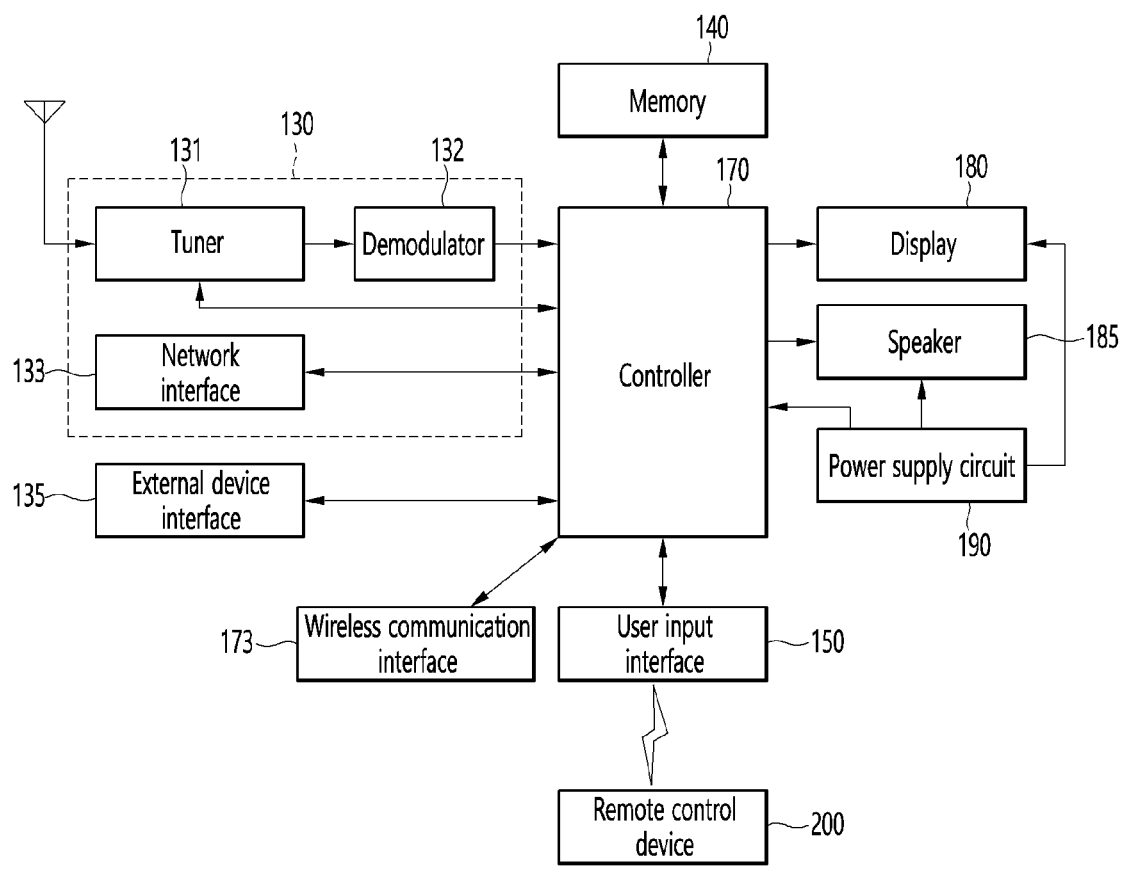
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
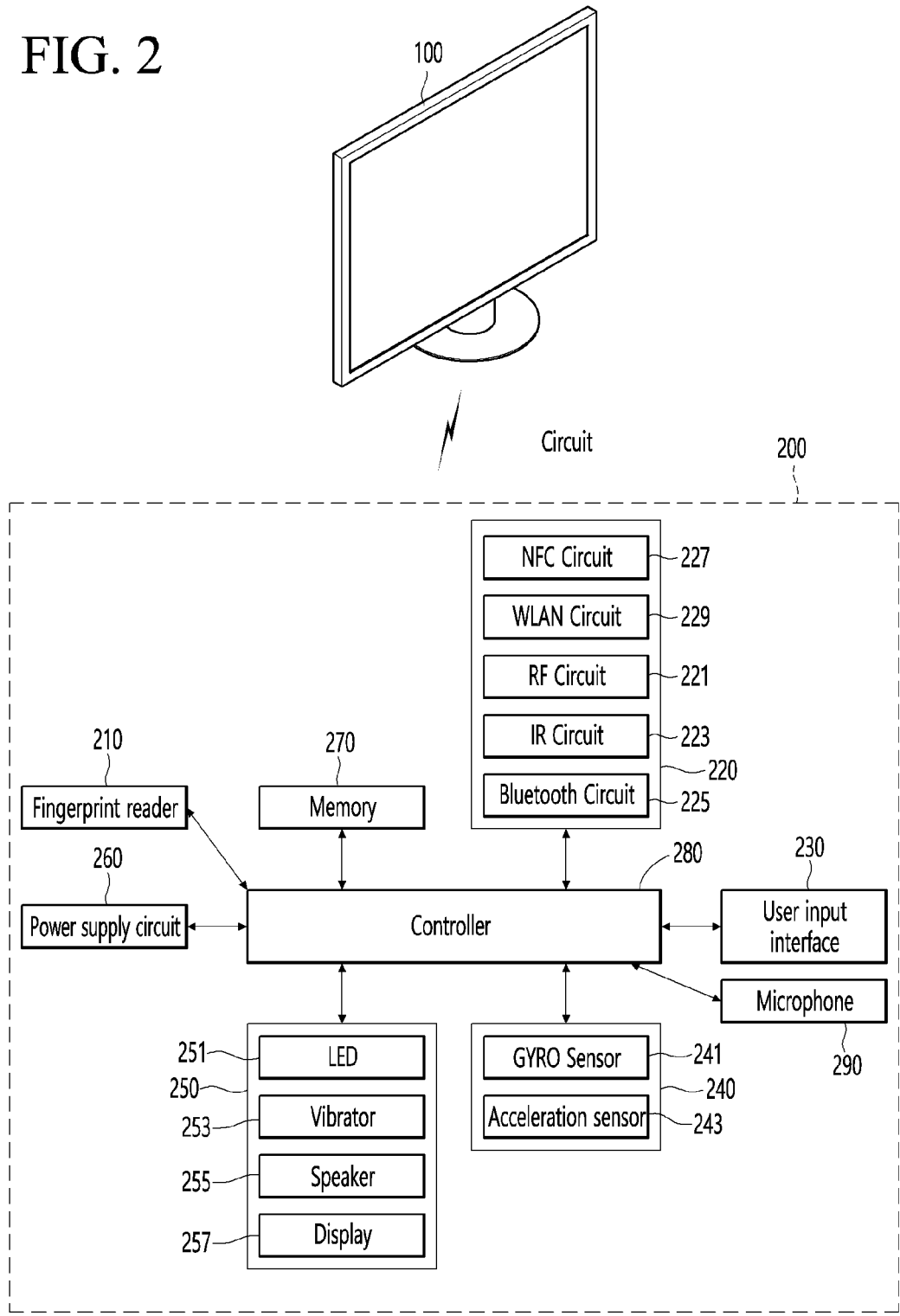
FIG. 2 is a block diagram of a remote control device according to an embodiment of the present disclosure.
Figure 3:
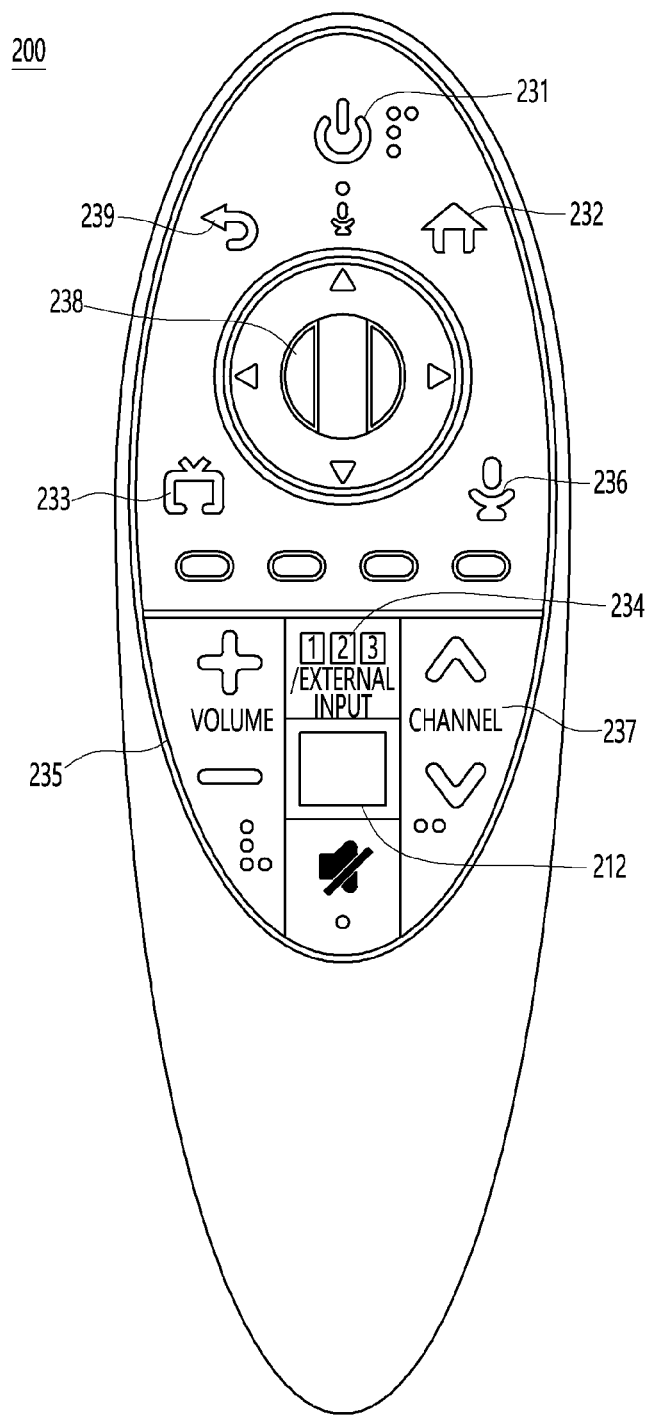
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
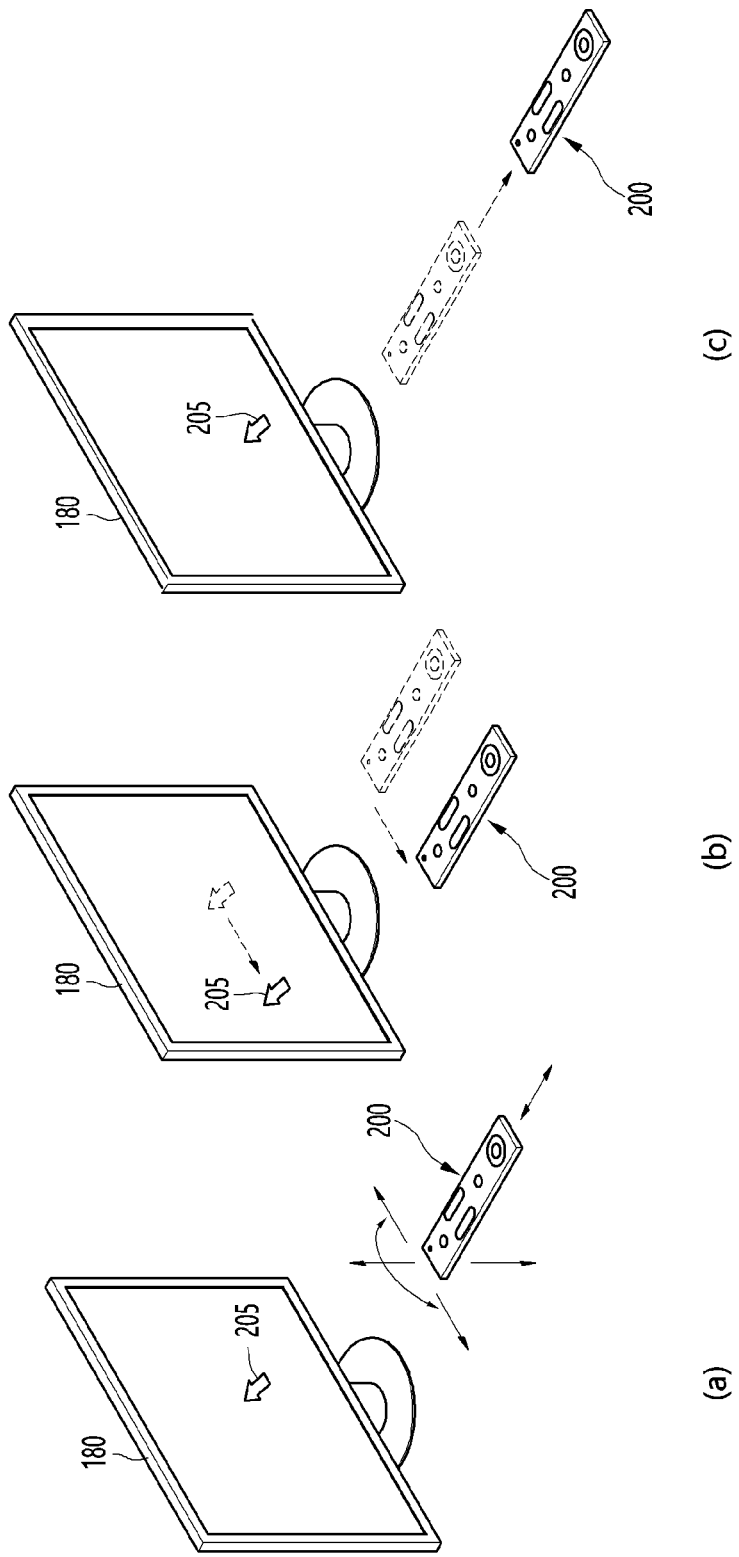
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
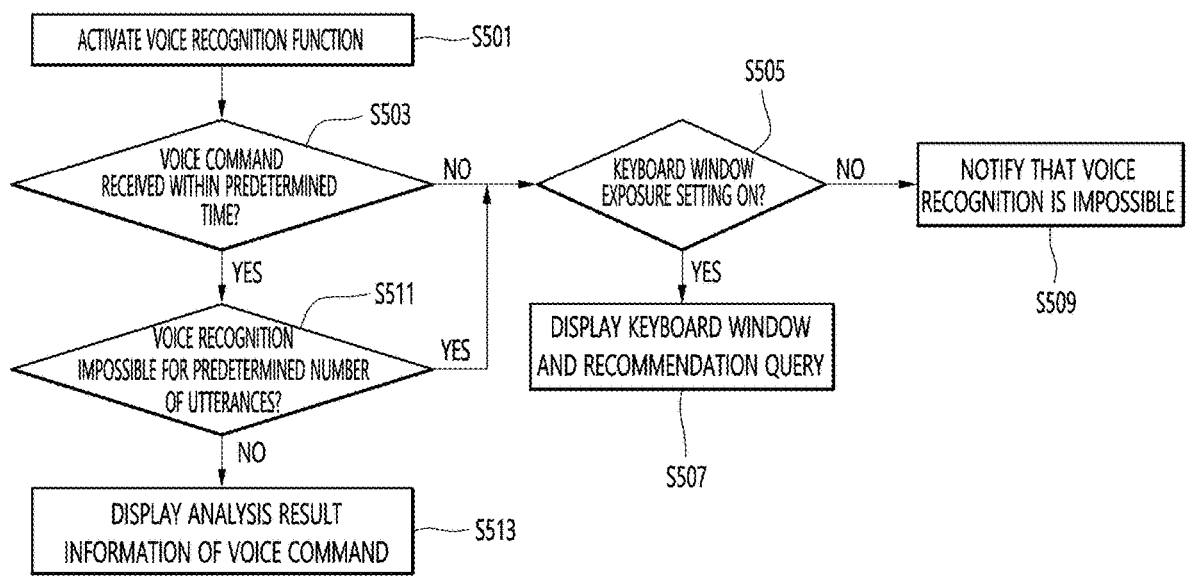
FIG. 5 is a flowchart illustrating a method of operating a display device according to an embodiment of the present disclosure.

FIG. 5 is a flowchart illustrating a method of operating a display device according to an embodiment of the present disclosure.

Although a description is given on the assumption that a utterance source is the remote control device 200 in FIG. 5, it may also be applied to the case where the utterance source is a user. The utterance source may indicate a provider that provides a voice command received by the display device 100.

Referring to FIG. 5, the controller 170 of the display device 100 activates a voice recognition function (S501).

The voice recognition function may be a function of recognizing an intention analysis result for a voice command uttered by a user.

In an embodiment, the controller 170 may receive a command for activating the voice recognition function from the remote control device 200. For example, the user may select a microphone button (not shown) provided in the remote control device 200. The remote control device 200 may transmit a control command for activating the voice recognition function according to selection of the microphone button to the display device 100.

The display device 100 may activate the voice recognition function according to a control command received from the remote control device 200.

In another embodiment, the controller 170 may activate the voice recognition function by recognizing a start word uttered by the user. The controller 170 may receive a start word through the microphone 290 provided in the display device 100 and activate the voice recognition function according to the received start word.

The controller 170 determines whether a voice command is received within a predetermined time in a state in which the voice recognition function is activated (S503).

The predetermined time may be 5 seconds, but this is only an example.

When the voice command is not received within the predetermined time, the controller 170 determines whether setting for keyboard window exposure is turned on (S505).

In an embodiment, the keyboard window may be a window exposed to assist a voice recognition function when a user's utterance command is not recognized.

When voice recognition according to the user's utterance has failed, the keyboard window may include one or more recommendation queries to assist the user's voice recognition function.

The recommendation query may be a recommendation keyword.

The user may turn on or off the setting for keyboard window exposure through a menu.

This will be described with reference to FIG. 6.

Figure 6:
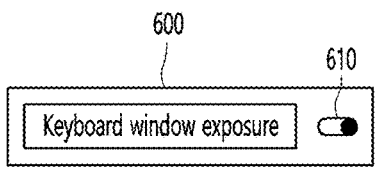
FIG. 6 is a view illustrating a setting menu for setting keyboard window exposure according to an embodiment of the present disclosure.

FIG. 6 is a view illustrating a setting menu for setting keyboard window exposure according to an embodiment of the present disclosure.

Referring to FIG. 6, the setting menu 600 for keyboard window exposure is shown.

The controller 170 may display the setting menu 600 on the display 180 upon receiving a command for displaying the menu.

The setting menu 600 may be a menu for setting whether to expose the keyboard window when voice recognition has failed. The user may turn on or off the setting of the keyboard window exposure through a toggle button 610 included in the setting menu 600.

The setting menu 600 is necessary because there may be users who do not prefer the exposure of the keyboard window even when voice recognition has failed.

A description will be given referring again to FIG. 5.

When the setting for keyboard window exposure is turned on, the controller 170 displays the keyboard window and the recommendation query on the display 180 (S507).

In an embodiment, when a content image is being reproduced on the display 180, the controller 170 may display the keyboard window to be superimposed on the content image.

In an embodiment, the controller 170 may obtain a recommendation query related to an app currently running on the display device 100, and display the obtained recommendation query on the keyboard window.

In another embodiment, the controller 170 may obtain a recommendation query capable of controlling the function of the display device 100, and display the obtained recommendation query on the keyboard window.

The keyboard window will be described with reference to FIGS. 7 and 8.

Figure 7:
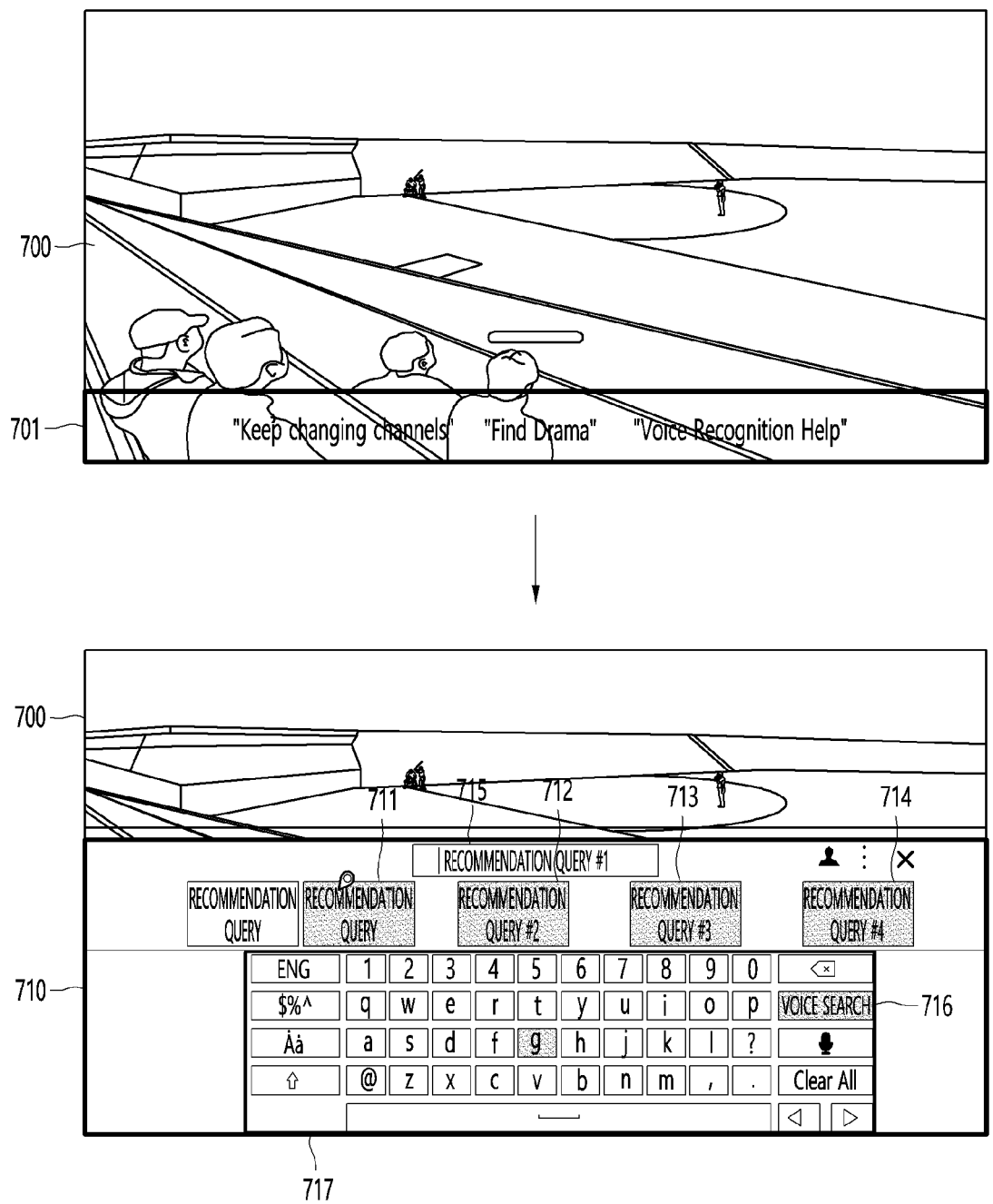
FIGS. 7 and 8 are views illustrating a method of exposing a keyboard window according to an embodiment of the present disclosure.
Figure 8:
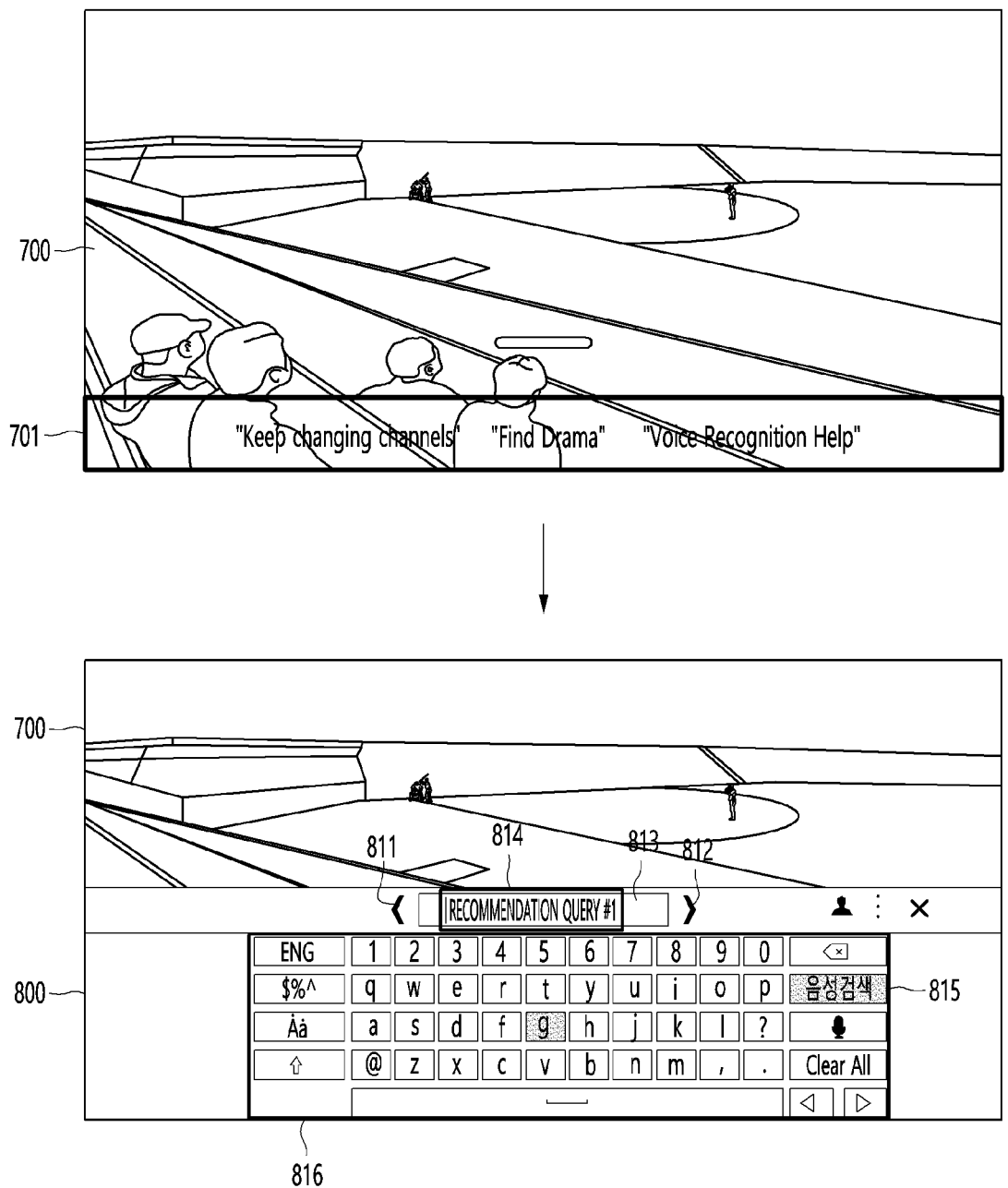

FIGS. 7 and 8 are views illustrating a method of exposing a keyboard window according to an embodiment of the present disclosure.

Referring to FIG. 7, the display device 100 may activate the voice recognition function while the content image 700 is being reproduced. The display device 100 may display a guide window 701 for guiding voice recognition as the voice recognition function is activated.

The guide window 701 is a window for inducing a specific utterance, and may include a plurality of voice commands.

The display device 100 may identify that voice recognition fails during reproduction of the content image 700 and expose a first keyboard window 710.

In an embodiment, the case in which voice recognition has failed may be a case in which a voice command is not received within a predetermined time while the voice recognition function is activated.

In another embodiment, the case in which voice recognition has failed may be a case in which voice recognition is impossible for a predetermined number of utterances or more in a state in which the voice recognition function is activated.

The first keyboard window 710 may be displayed while being superimposed on the content image 700.

The first keyboard window 710 may be a window representing a virtual keyboard.

The first keyboard window 710 may include a plurality of recommendation queries 711, 712, 713 and 714, a query input box 715, a voice search button 716 and a keyboard item 717 including a plurality of character keys.

In an embodiment, each of the plurality of recommendation queries 711, 712, 713, and 714 may be a keyword related to an app reproducing the content image 700.

In another embodiment, each of the plurality of recommendation queries 711, 712, 713, and 714 may be a keyword related to function control of the display device 100.

In an embodiment, the query input box 715 may be a window in which a query selected according to user input from among the plurality of recommendation queries 711, 712, 713, and 714 is displayed.

In another embodiment, the query input box 715 may be a window for displaying text selected through the keyboard item 717.

The voice search button 716 may be a button for executing a search for a query selected from among the plurality of recommendation queries 711, 712, 713, and 714 or a query input to the query input box 715.

When the voice search button 716 is selected, the display device 100 may perform a search for a recommendation query and display the search result on the display 180.

In an embodiment, the display device 100 may transmit the text for the recommendation query to a Natural Language Process (NLP) server and receive a search result for the recommendation query from the NLP server.

In another embodiment, the display device 100 may perform a search for a recommendation query through its integrated search app.

In another embodiment, when the currently running app has a search function, the display device 100 may perform a search for a recommendation query through the running app and provide a search result through the app.

Next, a description will be given referring to FIG. 8.

Referring to FIG. 7, the display device 100 may activate a voice recognition function while the content image 700 is being reproduced. The display device 100 may display a guide window 701 for guiding voice recognition as the voice recognition function is activated.

The display device 100 may identify that voice recognition has failed during reproduction of the content image 700 and expose a second keyboard window 800.

The second keyboard window 800 may be a window of a different type from that of the first keyboard window 710.

The display device 100 may display a window set according to a setting menu among the first keyboard window 710 and the second keyboard window 800.

The second keyboard window 800 may be displayed while being superimposed on the content image 700.

The second keyboard window 800 may be a window representing a virtual keyboard.

The second keyboard window 800 may include a left movement key 811, a right movement key 812, a query input box 813, a voice search button 815, and a keyboard item 816.

The query input box 813 may include a query display area 814 in which one recommendation query is displayed.

The left movement key 811 and the right movement key 812 may be keys for changing a recommendation query displayed in the query display area 814. The user may change the recommendation query displayed in the query display area 814 by selecting the left movement key 811 or the right movement key 812.

In an embodiment, the recommendation query displayed in the query display area 814 may be a keyword related to an app reproducing the content image 700.

In another embodiment, the recommendation query displayed in the query display area 814 may be a keyword related to the function control of the display device 100.

The query input box 813 may be a window for displaying text selected through the keyboard item 816.

The voice search button 815 may be a button for performing a search for a recommended query displayed in the query display area 814 or a query input to the query input box 813.

When the voice search button 815 is selected, the display device 100 may perform a search for a recommendation query and display the search result on the display 180.

As such, according to an embodiment of the present disclosure, when the voice recognition function cannot be used normally, a keyboard window for interworking with voice recognition may be exposed. Accordingly, the user may receive assistance in using the voice recognition function, and thus usability of the voice recognition function may be improved.

A description will be given referring again to FIG. 5.

When the setting for keyboard window exposure is turned off, the controller 170 displays a notification indicating that voice recognition is impossible on the display 180 (S509).

When the display of keyboard window exposure is set to off through the setting menu 600, the controller 170 may not display the keyboard window even if voice recognition has failed. That is, the controller 170 may display a notification indicating that voice recognition is impossible or that voice recognition has failed on the display 180.

On the other hand, when receiving the voice command within the predetermined time, the controller 170 determines whether voice recognition is impossible for a predetermined number of utterances (S511).

In an embodiment, the controller 170 may receive a voice command m times for n seconds, and may determine that the voice recognition has failed when the voice recognition fails m times.

When m voice commands are transmitted to the NLP server and any analysis results for the voice commands are not received from the NLP server, the controller 170 may determine that voice recognition has failed.

Upon determining that voice recognition is impossible for the predetermined number of utterances, the controller 170 determines whether the setting for keyboard window exposure is turned on (S505), and performs subsequent steps.

When voice recognition is possible for the predetermined number of utterances, the controller 170 displays analysis result information of the received voice command on the display 180 (S513).

The controller 170 may transmit a voice signal corresponding to a voice command to a Speech To Text (STT) server.

The STT server may convert the voice signal into text and transmit the converted text to the NLP server.

The NLP server may generate analysis result information indicating a result of performing intention analysis on text, and transmit the generated analysis result information to the display device 100. The analysis result information may include a search result for text.

The NLP server may transmit the analysis result information to the search server, receive the search result from the search server, and transmit the received search result to the display device 100.

Figure 9:
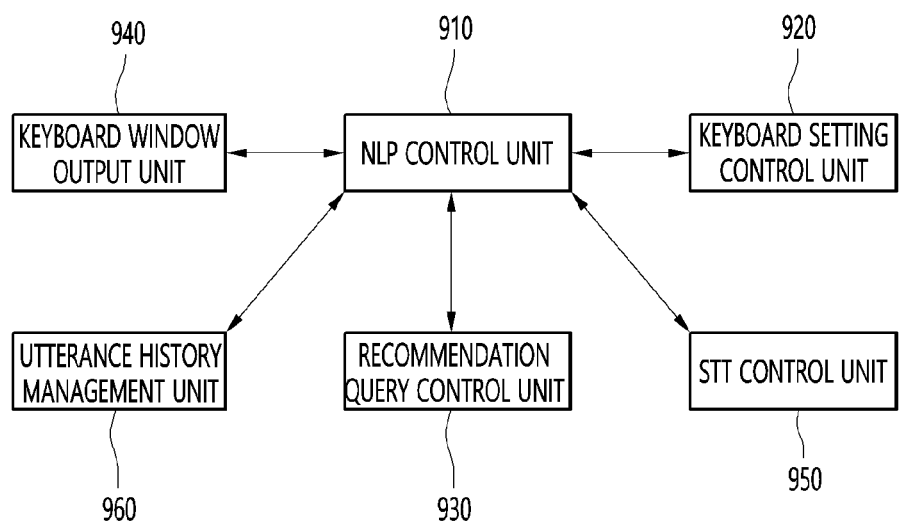
FIG. 9 is a view illustrating a configuration of a controller according to an embodiment of the present disclosure.

FIG. 9 is a view illustrating a configuration of a controller according to an embodiment of the present disclosure.

Referring to FIG. 9, the controller 170 may include an NLP control unit 910, a keyboard setting control unit 920, a recommendation query control unit 930, a keyboard window output unit 940, an STT control unit 950, and a utterance history management unit 960.

The NLP control unit 910 may receive a release command of a microphone button provided in the remote control device 200 from the remote control device 200.

The NLP control unit 910 may request exposure setting information of the keyboard window from the keyboard setting control unit 920 as it detects that a voice command has not been received within the predetermined time, and may receive a keyboard window exposure setting information response in response to the request.

When the exposure setting of the keyboard window is set to on, the NLP control unit 910 may request a recommendation query from the recommendation query control unit 930 and receive a recommendation query response in response to the request of the recommendation query.

The keyboard setting control unit 920 may receive user input for setting whether to set the exposure of the keyboard window, and may turn on or off the setting of the exposure of the keyboard window according to the received user input.

The recommendation query controller 930 may generate one or more recommendation queries.

The recommendation query control unit 930 may be a component included in the NLP server. In this case, the NLP control unit 910 may request a recommendation query from the NLP server through the network interface 133 and receive the recommendation query from the NLP server.

The keyboard window output unit 940 may receive a selection command of a recommendation query and a voice search command through the keyboard window, and transmit a search request for the recommendation query selected according to the received voice search command to the NLP control unit 910.

The STT controller 950 may convert the voice command into text and obtain a keyword most similar to the converted text. The STT control unit 950 may be a component provided in the NLP server. In this case, the NLP control unit 910 may request a candidate query from the NLP server through the network interface 133 and receive the candidate query from the NLP server.

The utterance history management unit 960 may store or search for utterance history information corresponding to user's identification information.

Figure 10:
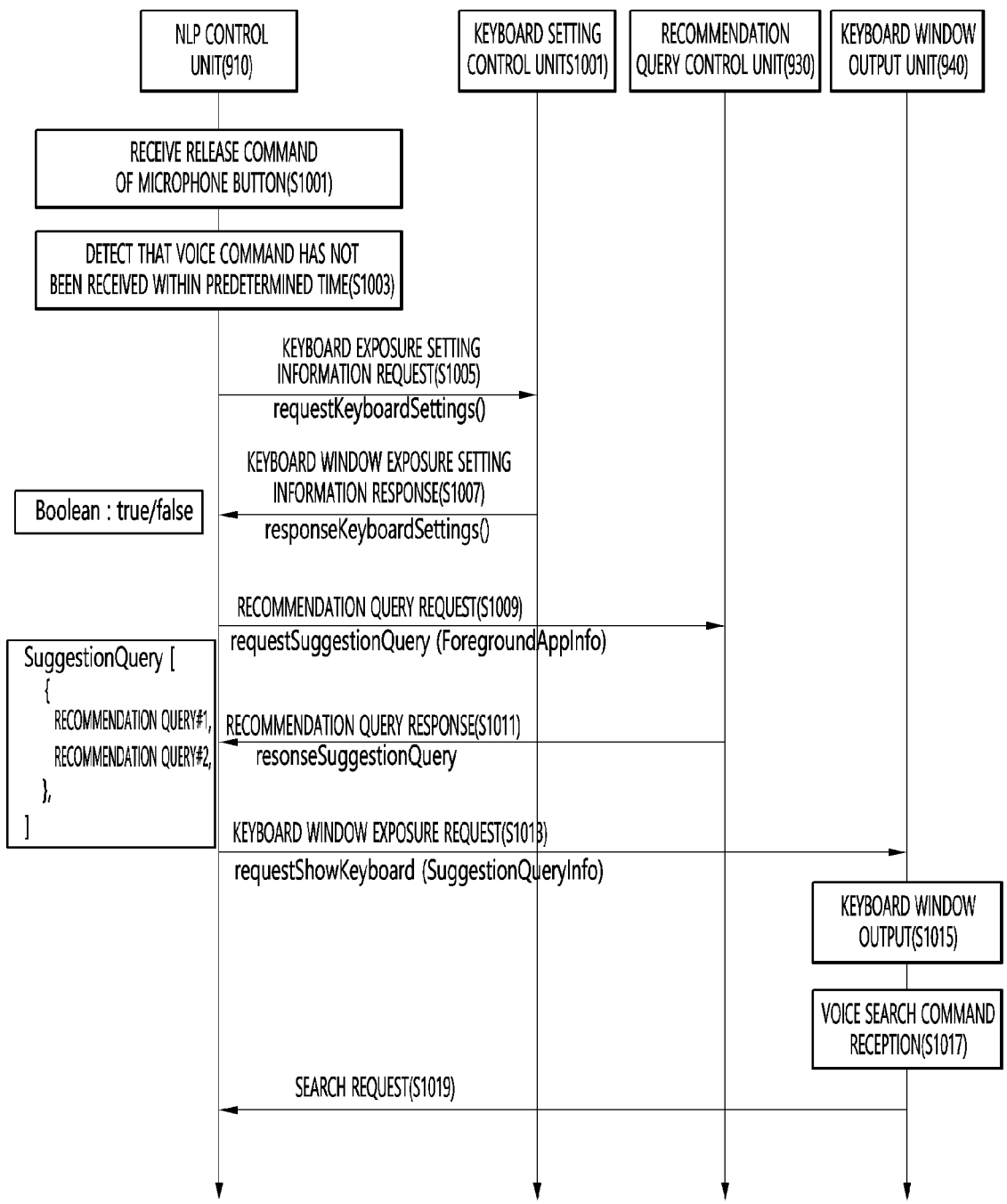
FIG. 10 is a view illustrating a method of providing a recommendation query when a voice command is not received within a predetermined time according to an embodiment of the present disclosure.

FIG. 10 is a view illustrating a method of providing a recommendation query when a voice command is not received within a predetermined time according to an embodiment of the present disclosure.

Referring to FIG. 10, the NLP control unit 910 receives a release command of the microphone button provided in the remote control device 200 from the remote control device 200 (S1001).

The release command of the microphone button may be generated when the microphone button provided in the remote control device 200 is pressed and released.

The NLP control unit 910 may activate the voice recognition function of the display device 100 upon receiving the release command of the microphone button.

The NLP control unit 910 detects that the voice command has not been received within a predetermined time (S1003).

The NLP control unit 910 may detect that a voice command is not received within a predetermined time in a state in which the voice recognition function is activated.

The NLP control unit 910 requests exposure setting information of the keyboard window from the keyboard setting control unit 920 upon detecting that the voice command has not been received within the predetermined time (S1005), and receives a keyboard window exposure setting information response in response to the request (S1007).

The keyboard window exposure setting information response may include any one of a <true> value or a <false> value.

The <true> value may indicate that the exposure setting of the keyboard window is turned on in the setting menu 600, and the <false> value may indicate that the exposure setting of the keyboard window is turned off in the setting menu 600.

When the exposure setting of the keyboard window is set to on, the NLP control unit 910 requests a recommendation query from the recommendation query control unit 930 (S1009), and receives a recommendation query response in response to the request of the recommendation query (S1011).

The recommendation query control unit 930 may obtain one or more recommendation queries in response to the request of the recommendation query.

In an embodiment, the recommendation query control unit 930 may generate a recommendation query related to an app currently running on the display device 100.

In another embodiment, the recommendation query control unit 930 may generate a recommendation query related to the content image currently being reproduced by the display device 100.

In another embodiment, the recommendation query control unit 930 may generate a recommendation query related to control of the function of the display device 100.

The NLP control unit 910 transmits a keyboard window exposure request including a recommendation query to the keyboard window output unit 940 (S1013).

The keyboard window output unit 940 outputs a keyboard window to the display 180 in response to the keyboard window exposure request (S1015).

The keyboard window output unit 940 receives a voice search command through the keyboard window (S1017), and transmits a search request for a recommendation query to the NLP control unit 910 according to the received voice search command (S1019).

When any one of the voice search button 716 described in FIG. 7 or the voice search button 815 described in FIG. 8 is selected, the keyboard window output unit 940 may determine that a voice search command has been received.

Figure 11:
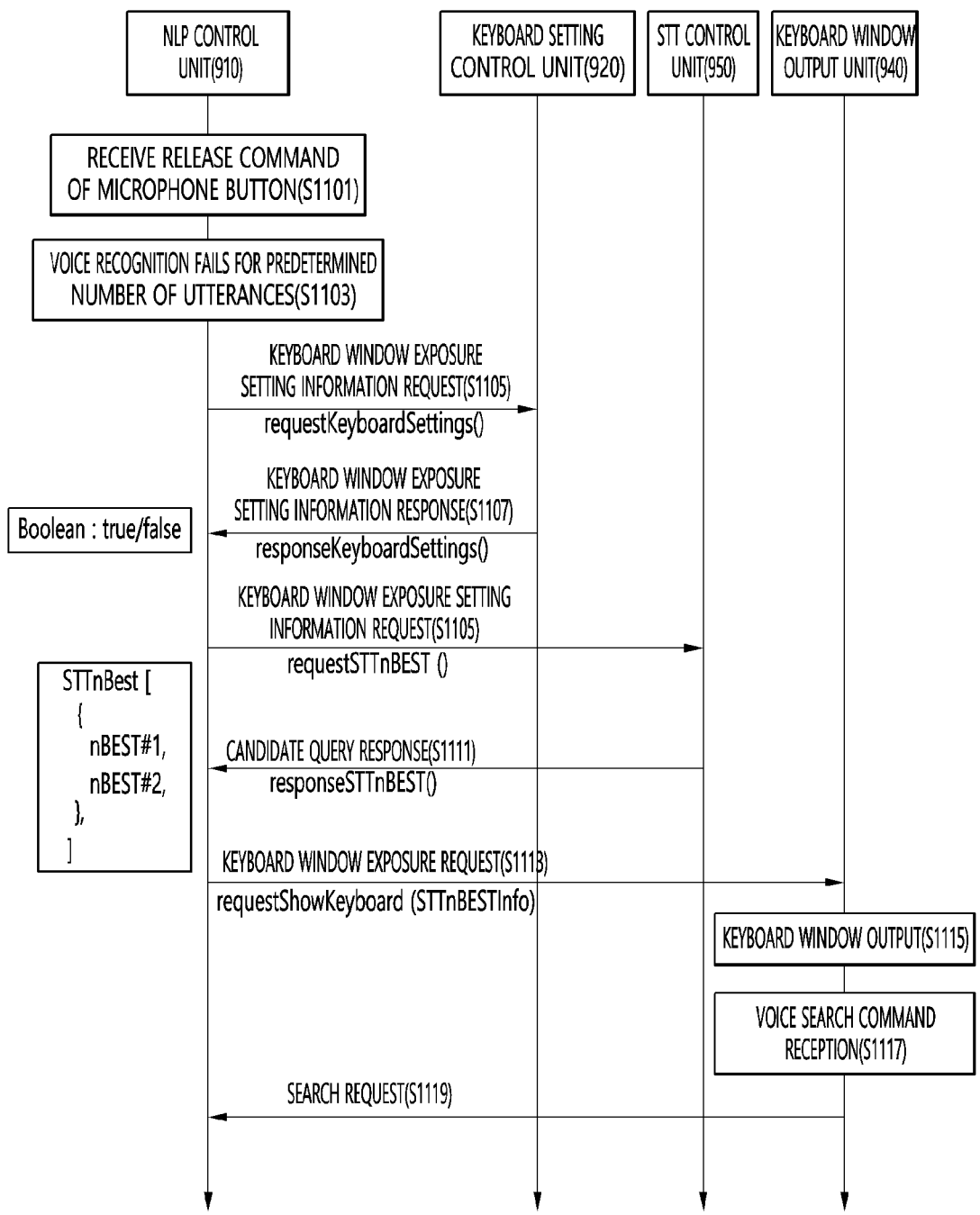
FIG. 11 is a view illustrating a method of providing a candidate query when voice recognition has failed for a predetermined number of utterances according to an embodiment of the present disclosure.

FIG. 11 is a view illustrating a method of providing a candidate query when voice recognition has failed for a predetermined number of utterances according to an embodiment of the present disclosure.

Referring to FIG. 11, the NLP control unit 910 receives a release command of the microphone button provided in the remote control device 200 from the remote control device 200 (S1101).

The release command of the microphone button may be generated when the microphone button provided in the remote control device 200 is pressed and released.

The NLP control unit 910 may activate the voice recognition function of the display device 100 upon receiving the release command of the microphone button.

The NLP control unit 910 detects that voice recognition has failed for more than a predetermined number of utterances (S1103).

The NLP control unit 910 may receive a voice command multiple times and determine that voice recognition has failed when intention analysis result information for multiple voice commands fails to be obtained.

The NLP control unit 910 requests keyboard window exposure setting information from the keyboard setting control unit 920 (S1105), and receives a keyboard window exposure setting information response in response to the request (S1107).

The keyboard window exposure setting information response may include any one of a <true> value or a <false> value.

The <true> value may indicate that the exposure setting of the keyboard window is turned on in the setting menu 600, and the <false> value may indicate that the exposure setting of the keyboard window is turned off in the setting menu 600.

When the exposure setting of the keyboard window is set to on, the NLP control unit 910 requests a candidate query from the STT control unit 950 (S1109), and receives a candidate query response in response to the request of the candidate query from the STT control unit 950 (S1111).

The candidate query may be a type of recommendation query to be provided in the keyboard window.

The STT controller 950 may obtain one or more candidate queries in response to the request of the candidate query.

The STT controller 950 may obtain a voice command, which is a target of voice recognition failure, and a plurality of candidate queries with high reliability.

Specifically, the STT control unit 950 may convert a voice command, which is a target of voice recognition failure, into text, and obtain candidate queries similar to the converted text (reliability is greater than or equal to a preset value).

The NLP control unit 910 transmits a keyboard window exposure request including the candidate query to the keyboard window output unit 940 (S1113).

The number of candidate queries may be three, but this is only an example.

The keyboard window output unit 940 outputs the keyboard window to the display 180 in response to the keyboard window exposure request (S1115).

The keyboard window output unit 940 receives a voice search command through the keyboard window (S1117), and transmits a search request for a recommendation query to the NLP control unit 910 according to the received voice search command (S1119).

When any one of the voice search button 716 described in FIG. 7 or the voice search button 815 described in FIG. 8 is selected, the keyboard window output unit 940 may determine that the voice search command has been received.

Figure 12:
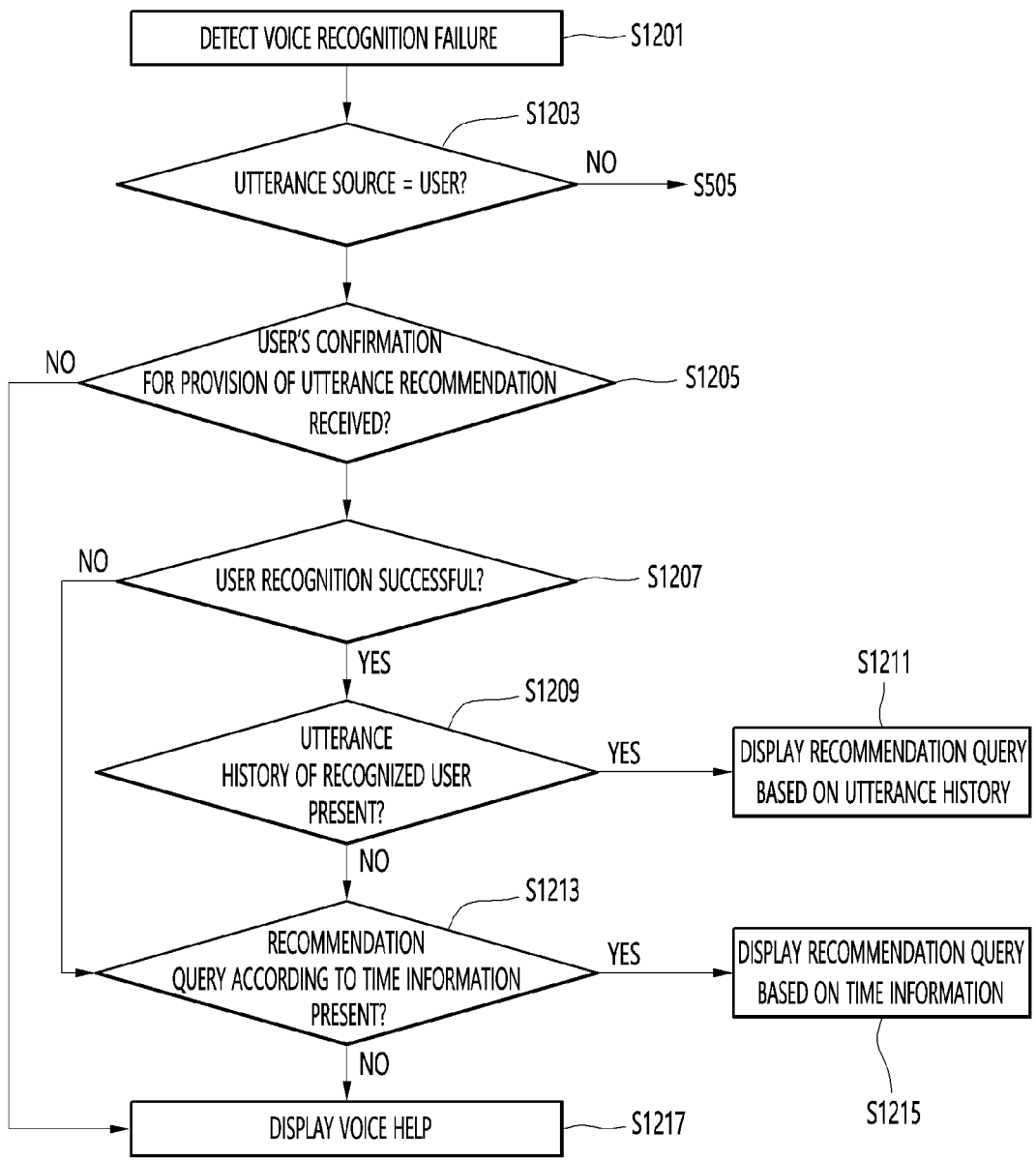
FIG. 12 is a flowchart illustrating a method of operating a display device according to another embodiment of the present disclosure.

FIG. 12 is a flowchart illustrating a method of operating a display device according to another embodiment of the present disclosure.

In particular, FIG. 12 is a view illustrating an example of providing a recommendation query in different forms according to an utterance source.

In FIG. 12, when the speech source is a user, voice recognition according to a voice command may be called long-distance voice recognition, and, when the speech source is the remote control device 200, voice recognition according to a voice command may be called short-range voice recognition.

Referring to FIG. 12, the controller 170 of the display device 100 detects voice recognition failure (S1201).

In an embodiment, when the voice command is not received within a predetermined time in a state in which the voice recognition function is activated, the controller 170 may detect that voice recognition has failed.

In another embodiment, when an analysis result for voice commands received a plurality of times is not obtained in a state in which the voice recognition function is activated, the controller 170 may detect that voice recognition has failed.

The controller 170 determines whether the utterance source for providing the voice command is a user in the process of speech recognition failure (S1203).

When the voice command is not received from the remote control device 200, the controller 170 may determine that the utterance source is a user.

When the utterance source is not a user, the controller 170 determines that the utterance source is the remote control device 200 and performs steps S505 and subsequent steps of FIG. 5.

Upon determining that the utterance source is the user, the controller 170 determines whether the user's confirmation for provision of the utterance recommendation has been received (S1205).

Upon determining that the utterance source is the user, the controller 170 may display a notification window indicating whether it is possible to provide utterance recommendation on the display 180.

For example, the notification window may include text <Do you want utterance recommendation? If you want, please say yes>.

When receiving the user's utterance of <yes>, the controller 170 may determine that the user's confirmation for provision of the utterance recommendation has been received.

When receiving the user's utterance of <no>, the controller 170 may determine that the user's confirmation for provision of the utterance recommendation is not received. In this case, the controller 170 may display voice help, which will be described later.

When the user's confirmation for provision of the utterance recommendation is received, the controller 170 determines whether recognition of the user who has uttered the voice command is successful (S1207).

The controller 170 may determine whether user recognition is successful through a camera (not shown). That is, the controller 170 may capture a user image through the camera and identify the user based on the captured image.

The controller 170 may obtain user's identification information based on the image. The user's identification information may include one or more of the user's name, age, gender, and ID.

When the user recognition is successful, the controller 170 determines whether a utterance history of the recognized user is present (S1209).

The controller 170 may search for the utterance history corresponding to the identification information based on the user's identification information.

The controller 170 may obtain utterance history information corresponding to the user's identification information from the memory 140. The utterance history information may include voice commands previously uttered by the user.

When the utterance history of the recognized user is present, the controller 170 displays a recommendation query based on the utterance history on the display 180 (S1211).

The controller 170 may obtain previously uttered voice commands and voice commands similar to previously uttered voice commands as a recommendation query based on the utterance history information.

Figure 13:
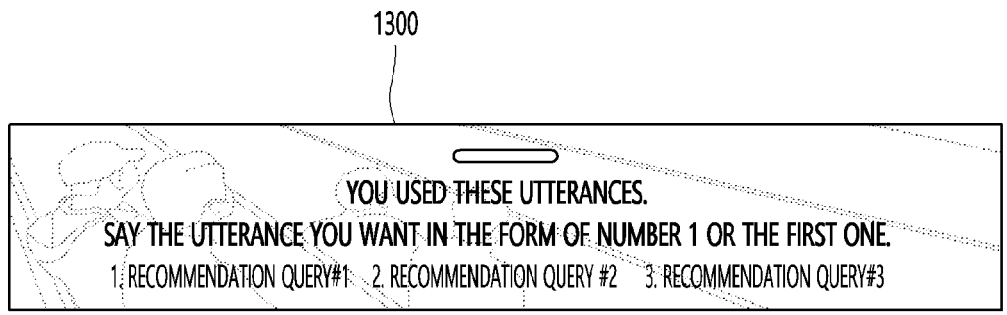
FIG. 13 is a view illustrating a recommendation query window providing a recommendation query based on a utterance history according to an embodiment of the present disclosure.

FIG. 13 is a view illustrating a recommendation query window providing a recommendation query based on a utterance history according to an embodiment of the present disclosure.

Referring to FIG. 13, when the utterance history of the recognized user is present, the display device 100 may display a recommendation query window 1300 including a plurality of recommendation queries based on the utterance history on the display 180.

The recommendation query window 1300 may include voice commands (recommendation queries) previously uttered by the recognized user and text indicating utterance induction of the voice command.

The reason for providing the recommendation query window 1300 instead of the keyboard window in the case of remote voice recognition is that it is difficult to control the keyboard window through the remote control device 200 when the distance between the user and the display device 100 is long.

Conversely, the reason for providing the keyboard window in the case of short-range voice recognition is that, when the distance between the user and the display device 100 is close, it is easy to control the keyboard window through the remote control device 200.

A description will be given referring again to FIG. 12.

When the utterance history of the recognized user is present, the controller 170 determines whether a recommendation query according to time information is present (S1213).

The controller 170 may obtain a recommendation query for each day of the week or time period from the server or the memory 140.

When the recommendation query according to the time information is present, the controller 170 displays the recommendation query based on the time information on the display 180 (S1215).

When the recommendation query according to time information is received from the server or stored in the memory 140, the controller 170 may display the obtained recommendation query on the display 180.

When the recommendation query according to the time information is not present, the controller 170 displays a voice help window on the display 180 (S1217).

Figure 14:
FIG. 14 is a view illustrating a voice help window according to an embodiment of the present disclosure.

FIG. 14 is a view illustrating a voice help window according to an embodiment of the present disclosure.

Referring to FIG. 14, when a recommendation query according to the utterance history and time information cannot be obtained, the display device 100 may display a voice help window 1400 for providing help on the voice recognition function on the display 180.

According to an embodiment of the present disclosure, when the utterance source is the remote control device 200 (short-range voice recognition), the display device 100 displays the first keyboard window 710 according to FIG. 7 or the second keyboard window 800 according to FIG. 8.

The display device 100 may display the recommendation query window 1300 according to FIG. 13 when the utterance source is the user (long-distance voice recognition).

In this way, the display device 100 may provide a recommendation query in different forms according to a distance between the utterance source or the user and the display device 100.

Although, in the exemplary embodiment of the present disclosure, the long-distance voice recognition or the short-distance voice recognition is classified according to whether the utterance source is the user or the remote control device 200, the present disclosure is not limited thereto.

That is, the display device 100 may include a separate distance sensor (e.g., an infrared sensor) for measuring the distance between the user and the display device 100 to measure the distance between the user and the display device 100.

The display device 100 may perform short-distance voice recognition when the measured distance is within a preset distance, and may perform long-distance voice recognition when the measured distance is greater than or equal to the preset distance.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A display device comprising:
a display;
a user interface; and
a controller configured to:
receive, via the user interface, a command provided by a remote control device, wherein the command is for activating a voice recognition function;

cause the display to display a keyboard window including one or more queries and a keyboard item, based on a failed voice recognition for a voice command received from a user and further based on an utterance source providing the voice command being the remote control device, while the voice recognition function is activated; and cause the display to display a recommended query window including a plurality of recommended queries, based on the utterance source providing the voice command being direct from the user.

2. The display device of claim 1, wherein the controller is further configured to:

determine that the voice recognition has failed, based on the voice command not being received within a defined time.

3. The display device of claim 2, wherein each of the plurality of recommended queries is any one of a query related to an application executable on the display device, a query related to a content image being reproduced on the display, or a query for controlling a function of the display device.

4. The display device of claim 1, wherein the controller is further configured to:

cause the display to display a search result for a query in response to a command for selecting the query from among the one or more queries displayed on the display.

5. The display device of claim 1, wherein the controller is further configured to:

determine that the voice recognition has failed, and cause the display to display the keyboard window including a plurality of candidate queries, based on the voice command not being recognized within a defined time and voice recognition being not possible for a defined number of utterances.

6. The display device of claim 5, wherein each of the plurality of candidate queries includes the voice command and a keyword that meets a reliability threshold.

7. The display device of claim 1, wherein the controller is further configured to:

determine that the voice recognition has failed, and cause the display to display a keyboard window movement key for providing the plurality of recommended queries and a query input box for input of a recommended query, based on the voice command not being recognized within a defined time.

8. The display device of claim 1, wherein the controller is further configured to:

cause the display to display a setting menu for setting display of the keyboard window on the display and to set whether to display the keyboard window according to a command input using the setting menu.

9. The display device of claim 1, wherein the plurality of recommended queries represent words previously uttered by the user.

10. A method for operating a display device, the method comprising:

receiving a command provided by a remote control device, wherein the command is for activating a voice recognition function;

determining whether voice recognition for a voice command uttered by a user has failed in a state in which the voice recognition function is activated according to the command; and displaying, on a display, a keyboard window including one or more queries and a keyboard item, based on a failed voice recognition for a voice command received from a user and further based on an utterance source providing the voice command being the remote control device, while the voice recognition function is activated; and displaying, on the display, a recommended query window including a plurality of recommended queries, based on the utterance source providing the voice command being direct from the user.

11. The method of claim 10, further comprising:

determining that the voice recognition has failed, based on the voice command not being received within a defined time.

12. The method of claim 11, wherein each of the plurality of recommended queries is any one of a query related to an application executable on the display device, a query related to a content image being reproduced on the display, or a query for controlling a function of the display device.

13. The method of claim 10, further comprising:

displaying, on the display, a search result for a query in response to a command for selecting the query from among the one or more queries displayed on the display.

14. The method of claim 10, further comprising:

determining that the voice recognition has failed, and displaying, on the display, the keyboard window including a plurality of candidate queries, based on the voice command not being recognized within a defined time and voice recognition being not possible for a defined number of utterances.

15. The method of claim 14, wherein each of the plurality of candidate queries includes the voice command and a keyword that meets a reliability threshold.

16. The method of claim 10, further comprising:

determining that the voice recognition has failed, and displaying, on the display, a keyboard window movement key for providing the plurality of recommended queries and a query input box for input of a recommended query, based on the voice command not being recognized within a defined time.

17. The method of claim 10, further comprising:

displaying, on the display, a setting menu for setting display of the keyboard window on the display and to set whether to display the keyboard window according to a command input using the setting menu.

18. The method of claim 10, wherein the plurality of recommended queries represent words previously uttered by the user.

* * * * *